(12) United States Patent
Li et al.

(10) Patent No.: US 10,862,629 B2
(45) Date of Patent: Dec. 8, 2020

(54) FEEDBACK MESSAGE SENDING METHOD, FEEDBACK MESSAGE PROCESSING METHOD, AND APPARATUS

(71) Applicant: Huawei Technologies Co., Ltd., Shenzhen (CN)

(72) Inventors: Chaojun Li, Beijing (CN); Yongxia Lyu, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 4 days.

(21) Appl. No.: 16/189,758

(22) Filed: Nov. 13, 2018

(65) Prior Publication Data

US 2019/0081742 A1 Mar. 14, 2019

Related U.S. Application Data

(63) Continuation of application No. PCT/CN2016/081871, filed on May 12, 2016.

(51) Int. Cl.
*H04L 5/00* (2006.01)
*H04L 1/18* (2006.01)
(Continued)

(52) U.S. Cl.
CPC .......... *H04L 1/1819* (2013.01); *H04L 1/1614* (2013.01); *H04L 1/1864* (2013.01);
(Continued)

(58) Field of Classification Search
CPC ....... H04L 5/0053; H04L 5/0055; H04L 5/00; H04L 5/0082; H04L 1/1896;
(Continued)

(56) References Cited

U.S. PATENT DOCUMENTS

2012/0207087 A1 8/2012 Wentink et al.
2013/0301503 A1 11/2013 Park
(Continued)

FOREIGN PATENT DOCUMENTS

CN 101547069 A 9/2009
CN 101867467 A 10/2010
(Continued)

OTHER PUBLICATIONS

"Details of Shorter TTI operation for Latency Reduction," 3GPP TSG-RAN WG1 Meeting #84bis, Busan, South Korea, R1-162788, pp. 1-5, 3rd Generation Partnership Project, Valbonne, France (Apr. 11-15, 2016).

(Continued)

*Primary Examiner* — Jae Y Lee
*Assistant Examiner* — Aixa A Guadalupe Cruz
(74) *Attorney, Agent, or Firm* — Leydig, Voit & Mayer, Ltd.

(57) ABSTRACT

A method is provided, including: determining, a first receiving state corresponding to a first data channel and a second receiving state corresponding to a second data channel; generating, a hybrid automatic repeat request-acknowledgement HARQ-ACK feedback message, where the HARQ-ACK feedback message is at least used to indicate the first receiving state and the second receiving state, a first time length of a time domain resource occupied by the first data channel is less than a second time length of a time domain resource occupied by the second data channel; and sending, the HARQ-ACK feedback message on a time domain resource having a third time length. By using the foregoing solution, the terminal device can efficiently feed back, receiving states corresponding to a plurality of data channels or a plurality of pieces of data transmission that occupy time (Continued)

domain resources of different lengths, thereby ensuring communication service quality.

20 Claims, 5 Drawing Sheets

(51) Int. Cl.
  *H04L 1/16* (2006.01)
  *H04W 76/28* (2018.01)
  *H04W 72/04* (2009.01)
(52) U.S. Cl.
  CPC ....... *H04L 5/0055* (2013.01); *H04W 72/0413* (2013.01); *H04W 72/0446* (2013.01); *H04W 76/28* (2018.02); *H04L 1/1812* (2013.01)
(58) Field of Classification Search
  CPC ......... H04L 5/0005; H04L 5/003; H04L 1/18; H04L 1/1864; H04L 1/1812
  See application file for complete search history.

(56) References Cited

U.S. PATENT DOCUMENTS

| | | | |
|---|---|---|---|
| 2015/0092715 A1 | 4/2015 | Seo et al. | |
| 2016/0065345 A1* | 3/2016 | Kim | H04L 5/0035 370/330 |
| 2016/0087772 A1 | 3/2016 | Yang et al. | |
| 2016/0285593 A1 | 9/2016 | Park | |
| 2018/0262307 A1* | 9/2018 | Shimezawa | H04L 5/1469 |

FOREIGN PATENT DOCUMENTS

| | | |
|---|---|---|
| CN | 102263622 A | 11/2011 |
| CN | 104135351 A | 11/2014 |
| JP | 2013542632 A | 11/2013 |
| JP | 2014504061 A | 2/2014 |
| JP | 2015015776 A | 1/2015 |
| JP | 2015520991 A | 7/2015 |
| WO | 2012030541 A1 | 3/2012 |
| WO | 2013022394 A2 | 2/2013 |

OTHER PUBLICATIONS

"Support different TTI length for data channels and PUCCH," 3GPP TSG RAN WG1 Meeting #84bis, Busan, Korea, R1-163101, pp. 1-4, 3rd Generation Partnership Project, Valbonne, France (Apr. 11-15, 2016).

"HARQ feedback for sTTI scheduling," 3GPP TSG-RAN WG1 Meeting #84bis, Busan, South Korea, R1-162546, pp. 1-4, 3rd Generation Partnership Project, Valbonne, France (Apr. 11-15, 2016).

"Short TTI operation with Carrier Aggregation," 3GPP TSG RAN WG1 Meeting #84bis, Busan, Korea, R1-163324, pp. 1-3, 3rd Generation Partnership Project, Valbonne, France (Apr. 11-15, 2016).

"Chairman's Notes of Agenda Item 7.3.10 on Study on Latency Reduction Techniques," 3GPP TSG RAN WG1 Meeting #84bis, Busan, Korea, R1-163843, pp. 1-9, 3rd Generation Partnership Project, Valbonne, France (Apr. 11-15, 2016).

"Short TTI PUCCH Design," 3GPP TSG RAN WG1 #84bis, Busan, Korea, R1-162965, pp. 1-3, 3rd Generation Partnership Project, Valbonne, France (Apr. 11-15, 2016).

Hu et al.,"Research on Error Controller of LTE Physical Layer," pp. 1-58, Huazhong University of Science and Technology, Wuhan, P.R. China (Jan. 2011). with English abstract.

Kim et al., "An Implementation of Downlink Asynchronous HARQ for LTE TDD System," 2012 IEEE Radio and Wireless Symposium (RWS 2012), pp. 1-4, Institute of Electrical and Electronics Engineers, New York, New York (2012).

* cited by examiner

FEEDBACK MESSAGE SENDING METHOD, FEEDBACK MESSAGE PROCESSING METHOD, AND APPARATUS

CROSS-REFERENCE TO RELATED APPLICATIONS

This application is a continuation of International Application No. PCT/CN2016/081871, filed on May 12, 2016, the disclosure of which is hereby incorporated by reference in its entirety.

TECHNICAL FIELD

Embodiments of the present invention relate to the field of communications systems, and in particular, to a feedback message generation method and apparatus, and a feedback message processing method and apparatus.

BACKGROUND

In a Long Term Evolution (LTE) system, after receiving downlink data sent by a network device, a terminal device needs to send a hybrid automatic repeat request-acknowledgement (HARQ-ACK) feedback message to the network device. If correctly receiving the downlink data, the terminal device returns an acknowledgement (ACK). If incorrectly receiving the downlink data, the terminal device returns a negative acknowledgement (NACK). The network device performs a subsequent operation based on the received HARQ-ACK feedback message, for example, determines whether to retransmit the downlink data. The HARQ-ACK feedback message may be carried on a physical uplink control channel (PUCCH) or a physical uplink shared channel (PUSCH).

In a wireless communications system, a latency is one of important factors that affect user experience, and continuously emerging new services impose an increasingly strict requirement on the latency. Therefore, in an existing LTE system, a transmission mechanism based on a transmission time length of one subframe, namely, 1 millisecond (ms), cannot meet a communication requirement of a low-latency service. To shorten a latency, a transmission time length of a physical downlink shared channel (PDSCH) needs to be reduced from one subframe to one timeslot or even one symbol. Further, to match different service requirements or scenario requirements, the terminal device needs to receive downlink data of a plurality of transmission time lengths. Therefore, how to efficiently feed back a receiving state of data of a plurality of transmission time lengths is a key to ensuring communication service quality.

SUMMARY

Embodiments of the present invention provide a feedback message sending method and apparatus, and a feedback message processing method and apparatus, so as to efficiently feed back a receiving state of data of a plurality of transmission time lengths.

According to a first aspect, a feedback message sending method is provided, including:

determining, by a terminal device, a first receiving state corresponding to a first data channel and a second receiving state corresponding to a second data channel;

generating, by the terminal device, a hybrid automatic repeat request-acknowledgement HARQ-ACK feedback message, where the HARQ-ACK feedback message is at least used to indicate the first receiving state corresponding to the first data channel and the second receiving state corresponding to the second data channel, a length of a time domain resource occupied by the first data channel is a first time length, a length of a time domain resource occupied by the second data channel is a second time length, and the first time length is less than the second time length; and sending, by the terminal device, the HARQ-ACK feedback message on a time domain resource having a third time length.

It should be noted that the feedback message sending method provided in this embodiment of the present invention may be applied to a scenario in which data is transmitted between a terminal device and a network device and a receiving state of the data is fed back, may be applied to a scenario in which data is transmitted between terminal devices and a receiving state of the data is fed back, and may be applied to a scenario in which data is transmitted between network devices and a receiving state of the data is fed back. For example, the feedback message sending method provided in the first aspect is performed by using the network device.

Optionally, before the sending, by the terminal device, the HARQ-ACK feedback message on a time domain resource having a third time length, the method further includes:

receiving, by the terminal device, signaling used to indicate the third time length.

Optionally, before the generating, by the terminal device, a hybrid automatic repeat request-acknowledgement HARQ-ACK feedback message, the method further includes:

receiving, by the terminal device, at least two downlink data channels, where the at least two downlink data channels include the first data channel and the second data channel, where the HARQ-ACK feedback message indicates the first receiving state and the second receiving state by using a logic and operation result of receiving states corresponding to all of the at least two downlink data channels.

Optionally, the HARQ-ACK feedback message includes first acknowledgement information and second acknowledgement information, the first acknowledgement information is used to indicate the first receiving state, and the second acknowledgement information is used to indicate the second receiving state corresponding to the second data channel; and in the HARQ-ACK feedback message, the first acknowledgement information is after the second acknowledgement information.

Optionally, in the HARQ-ACK feedback message, the first acknowledgement information is before the second acknowledgement information.

During feedback message decoding, a decoding success rate of information located in the front is higher in some coding schemes (for example, Reed-Muller (RM) coding). Therefore, acknowledgement information corresponding to a more frequently appearing data channel may be set before the HARQ-ACK feedback message, so that it can be ensured that a network device is more likely to correctly obtain a receiving state of the more frequently appearing data channel.

Optionally, the first data channel is one of M data channels, the second data channel is one of N data channels, and M and N are positive integers; and before the generating, by the terminal device, a hybrid automatic repeat request-acknowledgement HARQ-ACK feedback message, the method further includes at least one of following steps:

receiving, by the terminal device, the M data channels, where the first acknowledgement information is used to indicate logic and operation results of receiving states corresponding to all of the M data channels; or receiving, by the terminal device, the N data channels, where the second acknowledgement information is used to indicate logic and operation results of receiving states corresponding to all of the N data channels.

Optionally, the HARQ-ACK feedback message includes X pieces of acknowledgement information, the X pieces of acknowledgement information include the first acknowledgement information and the second acknowledgement information, the X pieces of acknowledgement information respectively indicate receiving states corresponding to X data channels, the X data channels include the first data channel and the second data channel, and X is an integer greater than or equal to 2.

Optionally, the X data channels include P received data channels and (X−P) unreceived data channels, P pieces of acknowledgement information in the X pieces of acknowledgement information are respectively used to indicate receiving states corresponding to the P received data channels, (X−P) pieces of acknowledgement information in the X pieces of acknowledgement information are respectively used to indicate receiving states corresponding to the (X−P) unreceived data channels, the receiving states corresponding to the (X−P) unreceived data channels are NACKs or DTX, P is an integer, and P≤X;

the first data channel is one of the P received data channels, or is one of the (X−P) unreceived data channels; and the second data channel is one of the P received data channels, or is one of the (X−P) unreceived data channels.

Optionally, before the sending, by the terminal device, the HARQ-ACK feedback message on a time domain resource having a third time length, the method further includes:

determining, by the terminal device, a physical uplink control channel PUCCH resource based on the first receiving state corresponding to the first data channel and the second receiving state corresponding to the second data channel, where the PUCCH resource is located on the time domain resource having the third time length; and the sending, by the terminal device, the HARQ-ACK feedback message on a time domain resource having a third time length includes:

sending, by the terminal device, the HARQ-ACK feedback message on the determined PUCCH resource.

Optionally, the first data channel and the second data channel are located in a first serving cell; and the HARQ-ACK feedback message is further used to indicate a third receiving state corresponding to a third data channel, where the third data channel is located in a second serving cell.

According to a second aspect, a feedback message processing method is provided, including:

receiving, by a network device, an HARQ-ACK feedback message on a time domain resource having a third time length, where the HARQ-ACK feedback message is at least used to indicate a first receiving state corresponding to a first data channel and a second receiving state corresponding to a second data channel, a length of a time domain resource occupied by the first data channel is a first time length, a length of a time domain resource occupied by the second data channel is a second time length, and the first time length is less than the second time length; and determining, by the network device based on the HARQ-ACK feedback message, the first receiving state corresponding to the first data channel and the second receiving state corresponding to the second data channel.

Optionally, before the receiving, by a network device, an HARQ-ACK feedback message on a time domain resource having a third time length, the method further includes:

sending, by the network device, signaling used to indicate the third time length.

Optionally, before the receiving, by a network device, an HARQ-ACK feedback message on a time domain resource having a third time length, the method further includes:

sending, by the network device, at least two downlink data channels, where the at least two downlink data channels include the first data channel and the second data channel, where the HARQ-ACK feedback message indicates the first receiving state and the second receiving state by using a logic and operation result of receiving states corresponding to all of the at least two downlink data channels.

Optionally, the HARQ-ACK feedback message includes first acknowledgement information and second acknowledgement information, the first acknowledgement information is used to indicate the first receiving state corresponding to the first data channel, and the second acknowledgement information is used to indicate the second receiving state corresponding to the second data channel; and in the HARQ-ACK feedback message, the first acknowledgement information is after the second acknowledgement information.

Optionally, the first data channel is one of M data channels, the second data channel is one of N data channels, and M and N are positive integers; and before the receiving, by a network device, an HARQ-ACK feedback message on a time domain resource having a third time length, the method further includes at least one of following steps:

sending, by the network device, the M data channels, where the first acknowledgement information is used to indicate logic and operation results of receiving states corresponding to all of the M data channels; or sending, by the network device, the N data channels, where the second acknowledgement information is used to indicate logic and operation results of receiving states corresponding to all of the N data channels.

Optionally, the HARQ-ACK feedback message includes X pieces of acknowledgement information, the X pieces of acknowledgement information include the first acknowledgement information and the second acknowledgement information, the X pieces of acknowledgement information respectively indicate receiving states corresponding to X data channels, the X data channels include the first data channel and the second data channel, and X is an integer greater than or equal to 2.

Optionally, the X data channels include P received data channels and (X−P) unreceived data channels, P pieces of acknowledgement information in the X pieces of acknowledgement information are respectively used to indicate receiving states corresponding to the P received data channels, (X−P) pieces of acknowledgement information in the X pieces of acknowledgement information are respectively used to indicate receiving states corresponding to the (X−P) unreceived data channels, the receiving states corresponding to the (X−P) unreceived data channels are NACKs or DTX, P is an integer, and P≤X;

the first data channel is one of the P received data channels, or is one of the (X−P) unreceived data channels; and the second data channel is one of the P received data channels, or is one of the (X−P) unreceived data channels.

Optionally, the determining, by the network device based on the HARQ-ACK feedback message, the first receiving state corresponding to the first data channel and the second receiving state corresponding to the second data channel includes:

determining, by the network device based on the HARQ-ACK feedback message and a physical uplink control channel PUCCH resource carrying the HARQ-ACK feedback message, the first receiving state corresponding to the first data channel and the second receiving state corresponding to the second data channel.

Optionally, the first data channel and the second data channel are located in a first serving cell; and the HARQ-ACK feedback message is further used to indicate a third receiving state corresponding to a third data channel, where the third data channel is located in a second serving cell.

According to a third aspect, a terminal device is provided, including:

a processor, configured to: determine a first receiving state corresponding to a first data channel and a second receiving state corresponding to a second data channel; and generate a hybrid automatic repeat request-acknowledgement HARQ-ACK feedback message, where the HARQ-ACK feedback message is at least used to indicate the first receiving state corresponding to the first data channel and the second receiving state corresponding to the second data channel, a length of a time domain resource occupied by the first data channel is a first time length, a length of a time domain resource occupied by the second data channel is a second time length, and the first time length is less than the second time length; and a transceiver, configured to send the HARQ-ACK feedback message on a time domain resource having a third time length.

According to a fourth aspect, another terminal device is provided, including:

a processing module, configured to: determine a first receiving state corresponding to a first data channel and a second receiving state corresponding to a second data channel; and generate a hybrid automatic repeat request-acknowledgement HARQ-ACK feedback message, where the HARQ-ACK feedback message is at least used to indicate the first receiving state corresponding to the first data channel and the second receiving state corresponding to the second data channel, a length of a time domain resource occupied by the first data channel is a first time length, a length of a time domain resource occupied by the second data channel is a second time length, and the first time length is less than the second time length; and a transceiver module, configured to send the HARQ-ACK feedback message on a time domain resource having a third time length.

Further, the terminal device in the third aspect and the terminal device in the fourth aspect may further include the following optional implementations.

Optionally, the transceiver or the transceiver module is configured to: before sending the HARQ-ACK feedback message on the time domain resource having the third time length, receive signaling used to indicate the third time length.

Optionally, the transceiver or the transceiver module is configured to: before the processor or the processing module generates the HARQ-ACK feedback message, receive at least two downlink data channels, where the at least two downlink data channels include the first data channel and the second data channel, where the HARQ-ACK feedback message indicates the first receiving state and the second receiving state by using a logic and operation result of receiving states corresponding to all of the at least two downlink data channels.

Optionally, the HARQ-ACK feedback message includes first acknowledgement information and second acknowledgement information, the first acknowledgement information is used to indicate the first receiving state corresponding to the first data channel, and the second acknowledgement information is used to indicate the second receiving state corresponding to the second data channel; and in the HARQ-ACK feedback message, the first acknowledgement information is after the second acknowledgement information.

Optionally, the first data channel is one of M data channels, the second data channel is one of N data channels, and M and N are positive integers; and the transceiver or the transceiver module is configured to perform at least one of following operations: before the processor or the processing module generates the HARQ-ACK feedback message, receive the M data channels, where the first acknowledgement information is used to indicate logic and operation results of receiving states corresponding to all of the M data channels; or receive the N data channels, where the second acknowledgement information is used to indicate logic and operation results of receiving states corresponding to all of the N data channels.

Optionally, the HARQ-ACK feedback message includes X pieces of acknowledgement information, the X pieces of acknowledgement information include the first acknowledgement information and the second acknowledgement information, the X pieces of acknowledgement information respectively indicate receiving states corresponding to X data channels, the X data channels include the first data channel and the second data channel, and X is an integer greater than or equal to 2.

Optionally, the X data channels include P received data channels and (X−P) unreceived data channels, P pieces of acknowledgement information in the X pieces of acknowledgement information are respectively used to indicate receiving states corresponding to the P received data channels, (X−P) pieces of acknowledgement information in the X pieces of acknowledgement information are respectively used to indicate receiving states corresponding to the (X−P) unreceived data channels, the receiving states corresponding to the (X−P) unreceived data channels are NACKs or DTX, P is an integer, and P≤X;

the first data channel is one of the P received data channels, or is one of the (X−P) unreceived data channels; and the second data channel is one of the P received data channels, or is one of the (X−P) unreceived data channels.

Optionally, the processor or the processing module is configured to: before the transceiver or the transceiver module sends the HARQ-ACK feedback message on the time domain resource having the third time length, determine a physical uplink control channel PUCCH resource based on the first receiving state corresponding to the first data channel and the second receiving state corresponding to the second data channel, where the PUCCH resource is located on the time domain resource having the third time length; and the transceiver or the transceiver module is configured to send the HARQ-ACK feedback message on the determined PUCCH resource.

Optionally, the first data channel and the second data channel are located in a first serving cell; and the HARQ-ACK feedback message is further used to indicate a third receiving state corresponding to a third data channel, where the third data channel is located in a second serving cell.

According to a fifth aspect, a network device is provided, including:

a transceiver, configured to receive an HARQ-ACK feedback message on a time domain resource having a third time length, where the HARQ-ACK feedback message is at least used to indicate a first receiving state corresponding to a first data channel and a second receiving state corresponding to a second data channel, a length of a time domain resource occupied by the first data channel is a first time length, a length of a time domain resource occupied by the second data channel is a second time length, and the first time length is less than the second time length; and a processor, configured to determine, based on the HARQ-ACK feedback message, the first receiving state corresponding to the first data channel and the second receiving state corresponding to the second data channel.

According to a sixth aspect, another network device is provided, including:

a transceiver module, configured to receive an HARQ-ACK feedback message on a time domain resource having a third time length, where the HARQ-ACK feedback message is at least used to indicate a first receiving state corresponding to a first data channel and a second receiving state corresponding to a second data channel, a length of a time domain resource occupied by the first data channel is a first time length, a length of a time domain resource occupied by the second data channel is a second time length, and the first time length is less than the second time length; and a processing module, configured to determine, based on the HARQ-ACK feedback message, the first receiving state corresponding to the first data channel and the second receiving state corresponding to the second data channel.

Further, the network device in the fifth aspect and the network device in the sixth aspect may further include the following optional implementations.

Optionally, the transceiver or the transceiver module is configured to: before receiving the HARQ-ACK feedback message on the time domain resource having the third time length, send signaling used to indicate the third time length.

Optionally, the transceiver or the transceiver module is configured to: before receiving the HARQ-ACK feedback message on the time domain resource having the third time length, send at least two downlink data channels, where the at least two downlink data channels include the first data channel and the second data channel, where the HARQ-ACK feedback message indicates the first receiving state and the second receiving state by using a logic and operation result of receiving states corresponding to all of the at least two downlink data channels.

Optionally, the HARQ-ACK feedback message includes first acknowledgement information and second acknowledgement information, the first acknowledgement information is used to indicate the first receiving state corresponding to the first data channel, and the second acknowledgement information is used to indicate the second receiving state corresponding to the second data channel; and in the HARQ-ACK feedback message, the first acknowledgement information is after the second acknowledgement information.

Optionally, the first data channel is one of M data channels, the second data channel is one of N data channels, and M and N are positive integers; and the transceiver or the transceiver module is configured to perform at least one of following operations: before receiving the HARQ-ACK feedback message on the time domain resource having the third time length, send the M data channels, where the first acknowledgement information is used to indicate logic and operation results of receiving states corresponding to all of the M data channels; or send the N data channels, where the second acknowledgement information is used to indicate logic and operation results of receiving states corresponding to all of the N data channels.

Optionally, the HARQ-ACK feedback message includes X pieces of acknowledgement information, the X pieces of acknowledgement information include the first acknowledgement information and the second acknowledgement information, the X pieces of acknowledgement information respectively indicate receiving states corresponding to X data channels, the X data channels include the first data channel and the second data channel, and X is an integer greater than or equal to 2.

Optionally, the X data channels include P received data channels and (X−P) unreceived data channels, P pieces of acknowledgement information in the X pieces of acknowledgement information are respectively used to indicate receiving states corresponding to the P received data channels, (X−P) pieces of acknowledgement information in the X pieces of acknowledgement information are respectively used to indicate receiving states corresponding to the (X−P) unreceived data channels, the receiving states corresponding to the (X−P) unreceived data channels are NACKs or DTX, P is an integer, and P≤X;

the first data channel is one of the P received data channels, or is one of the (X−P) unreceived data channels; and the second data channel is one of the P received data channels, or is one of the (X−P) unreceived data channels.

Optionally, the processor or the processing module is configured to determine, based on the HARQ-ACK feedback message and a physical uplink control channel PUCCH resource carrying the HARQ-ACK feedback message, the first receiving state corresponding to the first data channel and the second receiving state corresponding to the second data channel.

Optionally, the first data channel and the second data channel are located in a first serving cell; and the HARQ-ACK feedback message is further used to indicate a third receiving state corresponding to a third data channel, where the third data channel is located in a second serving cell.

By using the technical solutions in the embodiments of the present invention, the HARQ-ACK feedback message generated by the terminal device is at least used to indicate the first receiving state corresponding to the first data channel and the second receiving state corresponding to the second data channel, and the first time length of the time domain resource occupied by the first data channel is different from the second time length of the time domain resource occupied by the second data channel. Therefore, the terminal device does not need to respectively send a plurality of feedback messages for receiving states of a plurality of data channels, and can efficiently feed back, by using one HARQ-ACK feedback message, receiving states corresponding to a plurality of data channels that occupy time domain resources of different lengths, thereby ensuring communication service quality.

DESCRIPTION OF EMBODIMENTS

The following clearly and describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

The embodiments of the present invention can be applied to various communications systems, for example, Global System for Mobile Communications (GSM), Code Division Multiple Access (CDMA), Wideband Code Division Multiple Access (WCDMA), general packet radio service (GPRS), and Long Term Evolution (LTE).

The embodiments of the present invention can be applied to a wireless communications system including a network device and a terminal device (terminal device or terminal equipment). The terminal device may be a device that provides a user with at least one of voice or data connectivity, a handheld device with a wireless connection function, or another processing device connected to a wireless modem. The wireless terminal may communicate with one or more core networks through a radio access network (RAN). The wireless terminal may be a mobile terminal such as a mobile phone (also referred to as a "cellular" phone) and a computer with a mobile terminal, for example, may be a portable, pocket-sized, handheld, computer built-in, or in-vehicle mobile apparatus, which exchanges at least one of voice or data with the radio access network. For example, the wireless terminal may be a device such as a personal communication service (PCS) phone, a cordless telephone set, a Session Initiation Protocol (SIP) phone, a wireless local loop (WLL) station, or a personal digital assistant (PDA). The wireless terminal may also be referred to as a system, a subscriber unit (SU), a subscriber station (SS), a mobile station (MS), a remote station (RS), an access point (AP), a remote terminal (RT), an access terminal (AT), a user terminal (UT), a user agent (UA), user equipment, or user equipment (UE). The network device may be a base station, an enhanced base station, a relay having a scheduling function, a device having a base station function, or the like. The base station may be an evolved NodeB (eNB or eNodeB) in an LTE system, or may be a base station in another system. This is not limited in the embodiments of the present invention.

To enable a person skilled in the art to better understand the solutions in the embodiments of the present invention, the following further describes the embodiments of the present invention with reference to accompanying drawings and implementations.

Figure 1:
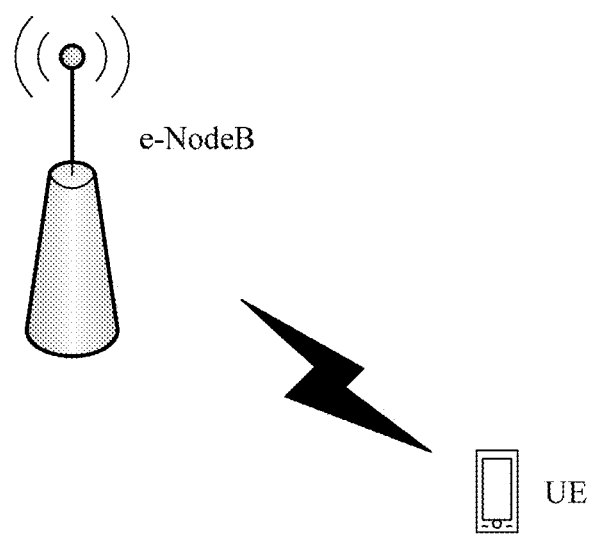
FIG. 1 is a diagram of a communication scenario according to an embodiment of the present invention.

FIG. 1 is a schematic diagram of a scenario of a communications system that can implement an embodiment of the present invention. It should be noted that the communications system in FIG. 1 is merely provided to more clearly describe this embodiment of the present invention, and can implement this embodiment of the present invention, and is not intended to limit the application scope of this embodiment of the present invention. This embodiment of the present invention may be further applied to another communications system, may include more terminal devices or more network devices, and certainly, may include no network device or terminal device.

For example, FIG. 1 describes an evolved NodeB (eNB or eNodeB) and user equipment (UE) in an LTE system. The UE may receive data from the eNB, and then feed back a receiving state of the data to the eNB. It should be noted that this embodiment of the present invention may be further applied to a scenario in which data is transmitted between terminal devices and a receiving state of the data is fed back, and a scenario in which data is transmitted between network devices and a receiving state of the data is fed back.

In an existing LTE system, one radio frame includes 10 subframes, a length of each subframe is 1 millisecond, each subframe includes two timeslots (slot), and each timeslot is 0.5 millisecond.

A quantity of symbols included in each timeslot is associated with a length of a cyclic prefix (CP) in a subframe. If the CP is a normal CP, each slot includes seven symbols, and each subframe includes 14 symbols. For example, each subframe includes symbols numbered #0, #1, #2, #3, #4, #5, #6, #7, #8, #9, #10, #11, #12, and #13. If the CP is an extended CP, each timeslot includes six symbols, and each subframe includes 12 symbols. For example, each subframe includes symbols numbered #0, #1, #2, #3, #4, #5, #6, #7, #8, #9, #10, and #11.

In this embodiment of the present invention, both an uplink symbol and a downlink symbol are briefly referred to as symbols. The uplink symbol is referred to as a single carrier frequency division multiple access (SC-FDMA) symbol, and the downlink symbol is referred to as an orthogonal frequency division multiplexing (OFDM) symbol. It should be noted that if a subsequent technology introduces an uplink multiple access manner of orthogonal frequency division multiple access (OFDMA), the uplink symbol may also be referred to as a symbol of another type, for example, an OFDM symbol. An uplink multiple access manner and a downlink multiple access manner are not limited in this embodiment of the present invention.

In a future evolved communications system, to shorten a latency, a length of a subframe may be reduced, for example, reduced to 0.2 ms, 0.25 ms, or a smaller value. A time length of a subframe and a time length of a symbol are not limited in this embodiment of the present invention.

Figure 2:
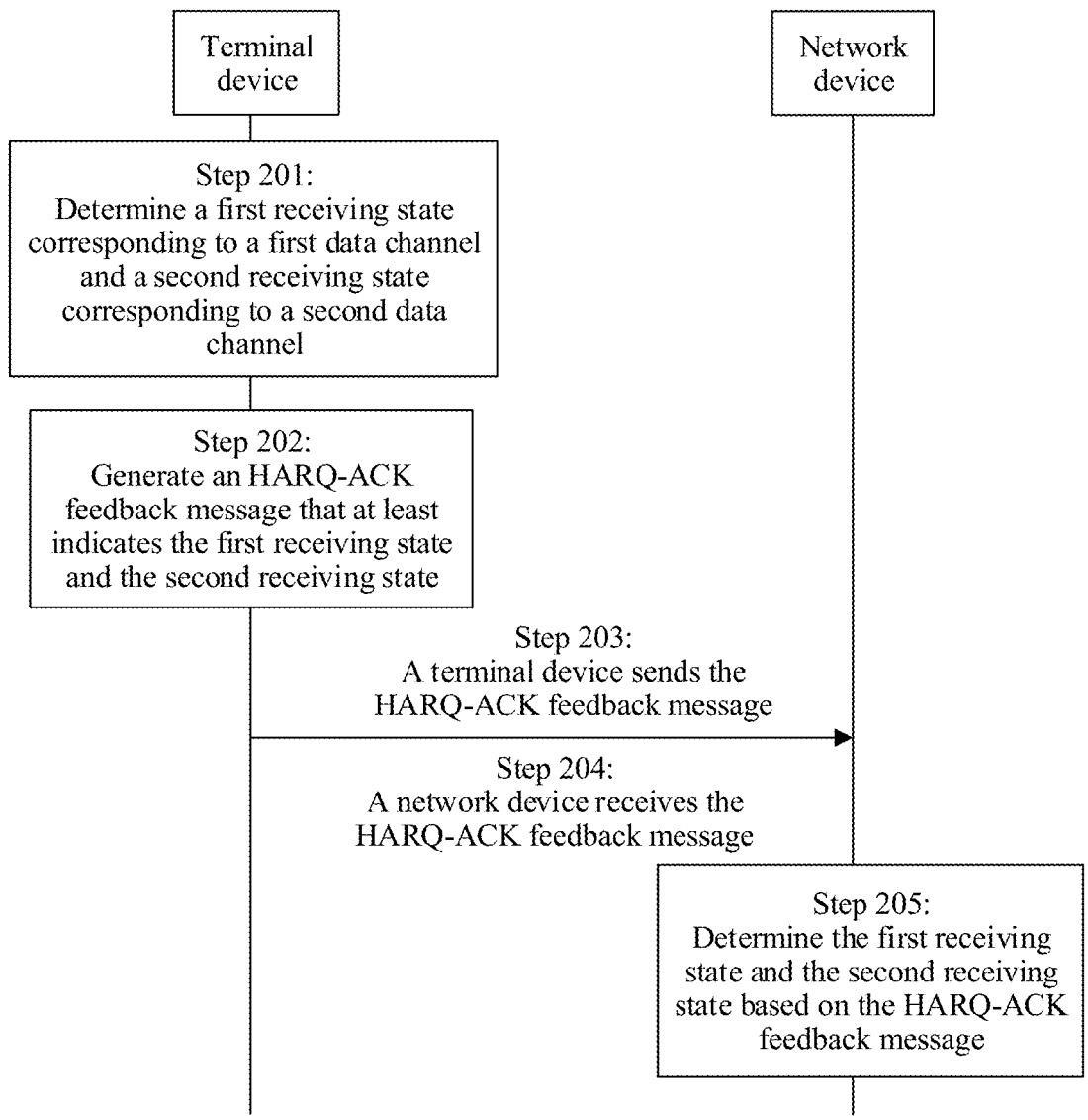
FIG. 2 is a first schematic diagram according to an embodiment of the present invention.

FIG. 2 is a flowchart of a feedback message sending and processing method according to an embodiment of the present invention. It should be noted that the embodiment in FIG. 2 is described by using an example in which a terminal device receives a downlink data channel from a network device and feeds back a receiving state corresponding to the downlink data channel. However, this embodiment of the present invention is not limited thereto, and any communication scenario in which data is received and a receiving state of the data is fed back is applicable to the technical solution provided in this embodiment of the present invention.

Step 201: The terminal device determines a first receiving state corresponding to a first data channel and a second receiving state corresponding to a second data channel.

For example, both the first data channel and the second data channel are PDSCHs, and the terminal device determines the first receiving state corresponding to the first PDSCH and the second receiving state corresponding to the second PDSCH. It should be noted that in this embodiment of the present invention, a technical solution in which a receiving state of a data channel is fed back is also applicable to feeding back a receiving state of a downlink control channel. For example, the downlink control channel carries downlink semi-persistent scheduling release (SPS Release) signaling.

Step 202: The terminal device generates a hybrid automatic repeat request-acknowledgement HARQ-ACK feedback message, where the HARQ-ACK feedback message is at least used to indicate the first receiving state corresponding to the first data channel and the second receiving state corresponding to the second data channel, a length of a time domain resource occupied by the first data channel is a first time length, a length of a time domain resource occupied by the second data channel is a second time length, and the first time length is less than the second time length.

Step 203: The terminal device sends the HARQ-ACK feedback message on a time domain resource having a third time length.

Step 204: The network device receives the HARQ-ACK feedback message.

Step 205: The network device determines, based on the HARQ-ACK feedback message, the first receiving state corresponding to the first data channel and the second receiving state corresponding to the second data channel.

Optionally, the receiving state of the data channel is an acknowledgement (ACK) or a negative acknowledgement (NACK). Optionally, the receiving state of the data channel is an ACK, a NACK, or discontinuous transmission (DTX). For example, if the terminal device determines that the first data channel is correctly received, the first receiving state is an ACK. Alternatively, if the terminal device determines that the first data channel is incorrectly received, the first receiving state is a NACK. Alternatively, if the terminal device determines that the first data channel is not received, the first receiving state is DTX. Alternatively, if the terminal device determines that the first data channel is not received, the first receiving state is a NACK, in other words, the NACK is used to indicate that no data channel is received. The second receiving state is corresponding to the second data channel, and is similar to the first receiving state. Details are not described herein again.

Optionally, the ACK is represented by '1' in binary, and the NACK is represented by '0' in binary. Optionally, the ACK is represented by '1' in binary, and the NACK and the DTX are represented by '0' in binary.

Optionally, the first time length and the second time length belong to a time length set A. The time length set A includes at least two time lengths of one symbol, two symbols, three symbols, four symbols, one slot, one subframe, and n subframes, and n is an integer greater than 1. For example, the time length set A includes two symbols and one subframe, or the time length set A includes two symbols, one slot, and one subframe. The first time length is less than the second time length. For example, the first time length is two symbols, three symbols, four symbols, or one slot, and the second time length is one subframe. Alternatively, the first time length is two symbols, three symbols, or four symbols, and the second time length is one slot. Alternatively, the first time length is two symbols, and the second time length is three or four symbols.

Optionally, the third time length may be one symbol, two symbols, three symbols, four symbols, one slot, one subframe, or n subframes, and n is an integer greater than 1. Optionally, the third time length is equal to the first time length or the second time length. If the third time length is equal to the first time length, a relatively short latency can be ensured. If the third time length is equal to the second time length, more energy may be used to transmit the HARQ-ACK feedback message, thereby ensuring an uplink coverage area as large as possible.

It should be noted that a time sequence relationship between a time domain resource occupied by the HARQ-ACK feedback message and each of time domain resources occupied by the first data channel and the second data channel that are corresponding to the HARQ-ACK feedback message is not limited in this embodiment of the present invention. For example, the time sequence relationship is predefined, or the time sequence relationship is indicated by using signaling. The terminal device determines, based on the time sequence relationship, a time domain resource on which the HARQ-ACK feedback message corresponding to the first data channel and the second data channel is located.

Optionally, before the terminal device sends the HARQ-ACK feedback message on the time domain resource having the third time length, the terminal device receives signaling used to indicate the third time length. Optionally, the signaling is physical layer signaling or higher layer signaling.

Optionally, before the network device receives the HARQ-ACK feedback message on the time domain resource having the third time length, the method further includes: sending, by the network device, signaling used to indicate the third time length.

Optionally, the HARQ-ACK feedback message is carried on a PUCCH or a PUSCH.

Optionally, the first data channel and the second data channel are located in a first serving cell. The HARQ-ACK feedback message is further used to indicate a third receiving state corresponding to a third data channel, and the third data channel is located in a second serving cell. It should be noted that when downlink carrier aggregation (CA) is configured, the terminal device may receive downlink data channels in a plurality of serving cells, that is, the terminal device may receive the downlink data channels on a plurality of downlink carriers. It may be considered that a "serving cell" is corresponding to a "downlink carrier" in this embodiment of the present invention.

Implementation 1

In an optional embodiment, before the terminal device generates the HARQ-ACK feedback message, the method further includes: receiving, by the terminal device, X data channels, where the X data channels include the first data channel and the second data channel, and X is an integer greater than or equal to 2. The HARQ-ACK feedback message indicates the first receiving state and the second receiving state by using a logic and operation result of X receiving states corresponding to the X data channels. In this case, "the terminal device generates an HARQ-ACK feedback message, where the HARQ-ACK feedback message is at least used to indicate the first receiving state corresponding to the first data channel and the second receiving state corresponding to the second data channel" in step 202 may also be described as "the terminal device generates an HARQ-ACK feedback message, where the HARQ-ACK feedback message is used to indicate logic and operation results of X receiving states corresponding to X data channels, and the X receiving states corresponding to the X data channels include the first receiving state corresponding to the first data channel and the second receiving state corresponding to the second data channel". Because the logic and operation result is the logic and operation results of the X receiving states corresponding to the X data channels received by the terminal device, the HARQ-ACK feedback message not only indicates, by using the logic and operation result, the receiving state corresponding to the first data channel and the receiving state corresponding to the second data channel, but also indicates, by using the logic and operation result, receiving states corresponding to data channels other than the first data channel and the second data channel in the X data channels. For example, if the logic and operation results of the receiving states corresponding to the X data channels are ACKs, each of the X receiving states corresponding to the X data channels is an ACK. If the logic and operation results of the receiving states corresponding to the X data channels are NACKs, at least one of the X receiving states corresponding to the X data channels is a NACK.

Correspondingly, before the network device receives the HARQ-ACK feedback message on the time domain resource having the third time length, the method further includes: sending, by the network device, X data channels, where the X data channels include the first data channel and the second data channel. In this case, step 204 may also be described as "the network device receives the HARQ-ACK feedback message on the time domain resource having the third time length, where the HARQ-ACK feedback message is used to indicate logic and operation results of X receiving states corresponding to the X data channels".

Optionally, the X receiving states corresponding to the X data channels are all ACKs, and the logic and operation result is an ACK. In this case, the HARQ-ACK feedback message indicates that both the first receiving state corresponding to the first data channel and the second receiving state corresponding to the second data channel are ACKs. Optionally, a receiving state corresponding to at least one of the X data channels is a NACK, and the logic and operation result is a NACK. For example, at least one of the first receiving state or the second receiving state is a NACK, and the logic and operation result is a NACK. In this case, the HARQ-ACK feedback message indicates that at least one of the X receiving states corresponding to the X data channels is a NACK.

Optionally, the X data channels include only the first data channel and the second data channel. For example, if both the first receiving state and the second receiving state are ACKs, logic and operation results of the first receiving state and the second receiving state are also ACKs, and the logic and operation results indicate that both the first receiving state and the second receiving state are ACKs. For example, if at least one of the first receiving state or the second receiving state is a NACK, logic and operation results of the first receiving state and the second receiving state are NACKs, and the logic and operation results indicate that at least one of the first receiving state or the second receiving state is a NACK. When the logic and operation result indicated by the HARQ-ACK feedback message is a NACK, the network device may determine that at least one of the first receiving state corresponding to the first data channel and the second receiving state corresponding to the second data channel is a NACK. Further, the network device retransmits the first data channel and the second data channel.

Optionally, transmission modes of the X data channels all support only one codeword, namely, only one transport block, and the HARQ-ACK feedback message includes 1-bit information indicating the logic and operation results of the X receiving states corresponding to the X data channels. Optionally, the 1-bit information indicates an ACK, and the network device determines, based on the HARQ-ACK feedback message, that both the first receiving state and the second receiving state are ACKs. Optionally, the 1-bit information indicates a NACK, and the network device determines, based on the HARQ-ACK feedback message, that both the first receiving state and the second receiving state are NACKs or at least one of the first receiving state or the second receiving state is a NACK. Optionally, the ACK is represented by '1' in binary, and the NACK is represented by '0' in binary. Therefore, when a binary value of the 1-bit information is 1, both the first receiving state and the second receiving state are ACKs, and the receiving states corresponding to the X data channels are all ACKs. When the binary value of the 1-bit information is 0, at least one of the X receiving states corresponding to the X data channels is a NACK.

Optionally, a transmission mode of at least one of the X data channels supports two codewords (respectively denoted as a codeword 0 and a codeword 1), namely, two transport blocks. The HARQ-ACK feedback message at least includes 2-bit information that is denoted as first bit information and second bit information. The first bit information indicates logic and operation results of receiving states corresponding to codewords 0 of the X data channels, and the second bit information indicates logic and operation results of receiving states corresponding to codewords 1 of the X data channels. It should be noted that if one data channel supports only one codeword, the codeword is denoted as a codeword 0, that is, only a receiving state corresponding to the codeword 0 participates in logic and operation processing. Optionally, the first bit information indicates an ACK, and the network device determines, based on the HARQ-ACK feedback message, that both a receiving state corresponding to a codeword 0 of the first data channel and a receiving state corresponding to a codeword 0 of the second data channel are ACKs. Alternatively, the first bit information indicates a NACK, and the network device determines, based on the HARQ-ACK feedback message, that at least one of the receiving states corresponding to the codewords 0 of the X data channels is a NACK. Optionally, the second bit information indicates an ACK, and the network device determines, based on the HARQ-ACK feedback message, that both a receiving state corresponding to a codeword 1 of the first data channel and a receiving state corresponding to a codeword 1 of the second data channel are ACKs. Alternatively, the second bit information indicates a NACK, and the network device determines, based on the HARQ-ACK feedback message, that at least one of the receiving states corresponding to the codewords 1 of the X data channels is a NACK.

Figure 4:
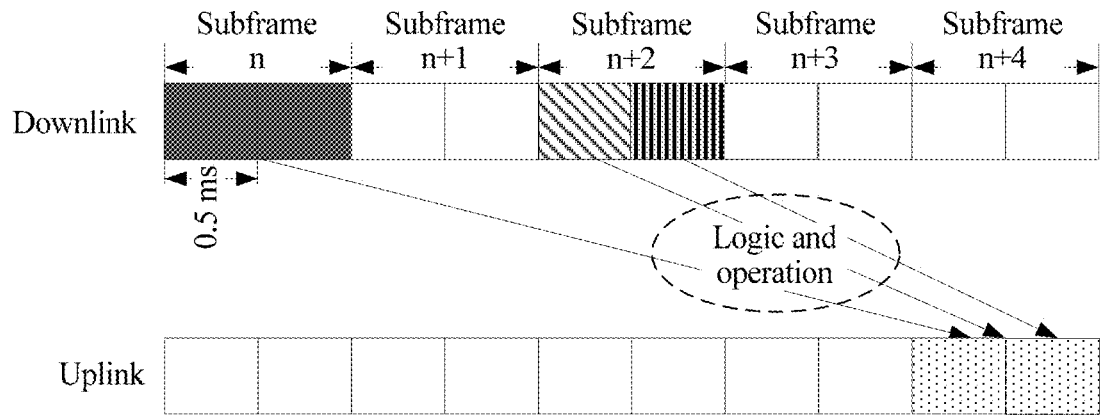
FIG. 4 is a third schematic diagram according to an embodiment of the present invention.

As shown in FIG. 4, the terminal device receives the first data channel, the second data channel, and the third data channel. The time domain resource occupied by the first downlink data channel is a first timeslot in a downlink subframe n+2, the time domain resource occupied by the second downlink data channel is a downlink subframe n, and the time domain resource occupied by the third downlink data channel is a second timeslot in the downlink subframe n+2. The terminal device sends the HARQ-ACK feedback message in an uplink subframe n+4. The HARQ-ACK feedback message indicates, by using logic and operation results of receiving states corresponding to the first downlink data channel, the second downlink data channel, and the third downlink data channel, the receiving state corresponding to the first downlink data channel and the receiving state corresponding to the second downlink data channel. Certainly, the HARQ-ACK feedback message further indicates, by using the logic and operation results, the receiving state corresponding to the third downlink data channel.

Optionally, the X data channels are located in a same serving cell.

Optionally, the first time length is two symbols, three symbols, four symbols, or 0.5 ms, and the second time length is 1 ms. When a short transmission time interval (TTI) mode is configured, a downlink data channel of a 1 ms time length is used as a backoff mechanism, and has a relatively low probability of occurrence. Therefore, time lengths of most downlink data channels received by the terminal device are less than 1 ms, and time lengths of a few downlink data channels are 1 ms. In this case, logic and operation processing may be performed on the receiving states of the two downlink data channels, so as to reduce a quantity of bits of the HARQ-ACK feedback message, and improve receiving performance of the HARQ-ACK feedback message. The short TTI is a TTI whose TTI length is less than 1 ms.

Optionally, the HARQ-ACK feedback message further indicates quantity feedback information, and the quantity feedback information is used to indicate a quantity that is of receiving states corresponding to data channels and that is fed back by the HARQ-ACK feedback message. It should be noted that the quantity that is of receiving states corresponding to data channels and that is fed back by the HARQ-ACK feedback message is also a quantity of data channels received by the terminal device. The network device can determine the quantity of data channels sent by the network device to the terminal device. Therefore, when receiving the HARQ-ACK feedback message, the network device may determine, based on the quantity feedback information, whether the quantity of data channels received by the terminal device is correct, so as to further ensure communication service quality.

For example, the terminal device may not identify an unreceived data channel, that is, the terminal device considers that the unreceived data channel does not exist. Therefore, the terminal device does not determine a receiving state corresponding to the unreceived data channel. When the HARQ-ACK feedback message provides a feedback by using logic and operation results of receiving states corresponding to all received data channels, and the logic and operation results are ACKs, the HARQ-ACK feedback message does not indicate the receiving state corresponding to the unreceived data channel either. However, the network device determines, based on the HARQ-ACK feedback message, that receiving states corresponding to all data channels sent by the network device all indicate correct data receiving. However, the terminal device does not actually receive the unreceived data channel. Therefore, if the HARQ-ACK feedback message further includes the quantity feedback information, when a quantity indicated by the quantity feedback information is less than the quantity of data channels sent by the network device, although the HARQ-ACK feedback message indicates that all the receiving states indicate correct data receiving, the network device knows that the unreceived data channel exists. Therefore, the network device may re-send the unreceived data channel to the terminal device, so as to prevent the terminal device from missing a data channel, and further ensure communication service quality.

Implementation 2

In an optional embodiment, the HARQ-ACK feedback message includes first acknowledgement information and second acknowledgement information, the first acknowledgement information is used to indicate the first receiving state corresponding to the first data channel, and the second acknowledgement information is used to indicate the second receiving state corresponding to the second data channel.

Optionally, step 205 includes: the network device determines, based on the first acknowledgement information, the first receiving state corresponding to the first data channel, and determines, based on the second acknowledgement information, the second receiving state corresponding to the second data channel.

Optionally, in the HARQ-ACK feedback message, the first acknowledgement information and the second acknowledgement information are arranged based on the lengths of the time domain resources occupied by the first data channel and the second data channel.

Figure 3:
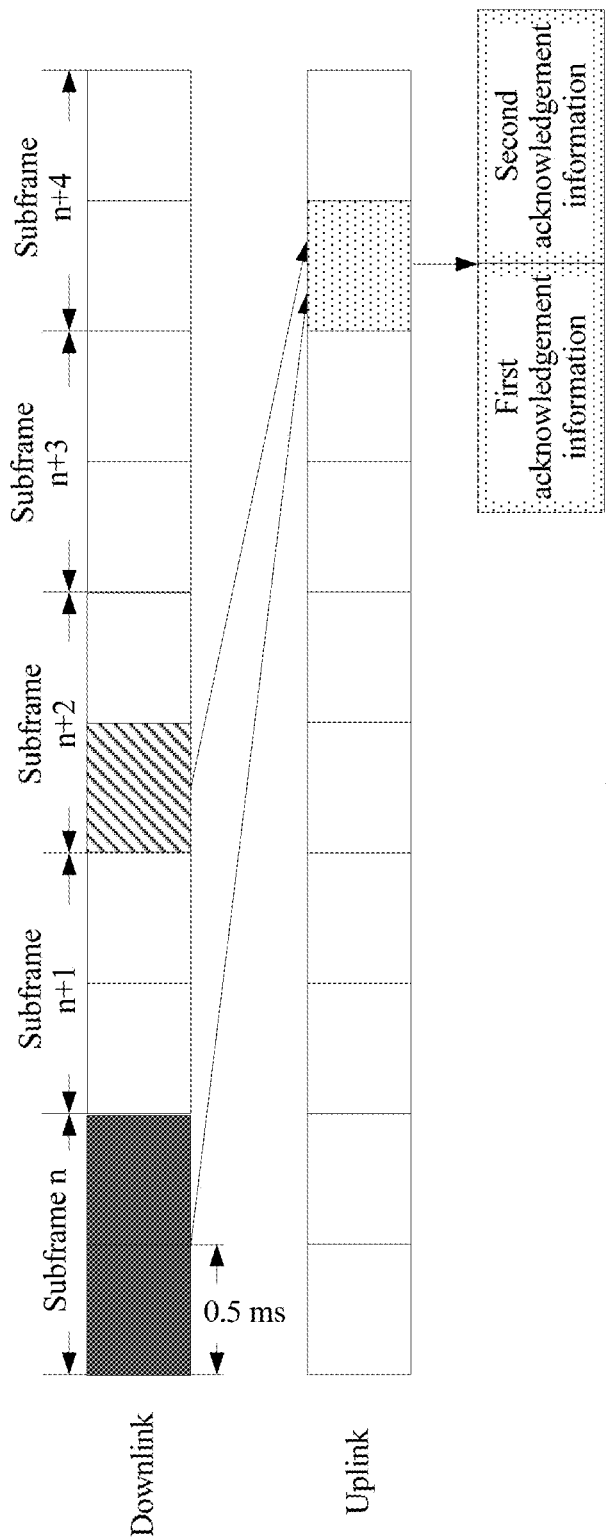
FIG. 3 is a second schematic diagram according to an embodiment of the present invention.

Optionally, in the HARQ-ACK feedback message, the first acknowledgement information is before the second acknowledgement information. In this case, because the length of the time domain resource occupied by the first data channel is less than the length of the time domain resource occupied by the second data channel, it may be considered that the first acknowledgement information and the second acknowledgement information are arranged in ascending order of lengths of occupied time domain resources. As shown in FIG. 3, the time domain resource occupied by the first data channel is a first timeslot in a downlink subframe n+2, the time domain resource occupied by the second data channel is a downlink subframe n, and the terminal device sends the HARQ-ACK feedback message in a first timeslot of an uplink subframe n+4. The length of the time domain resource occupied by the first data channel is less than the length of the time domain resource occupied by the second data channel. Therefore, in the generated HARQ-ACK feedback message, the first acknowledgement information used to indicate the first receiving state is before the second acknowledgement information used to indicate the second receiving state. A decoding success rate of information located in the front is higher in some channel coding schemes (for example, Reed-Muller (RM) coding). If a downlink data channel of a shorter time length has a higher probability of occurrence, a receiving state corresponding to the downlink data channel of a shorter time length may be preferentially protected. Because the first time length is less than the second time length, the first acknowledgement information is before the second acknowledgement information, so that it can be ensured that a probability of correctly obtaining the first receiving state by the network device is higher than a probability of correctly obtaining the second receiving state.

Optionally, in the HARQ-ACK feedback message, the first acknowledgement information may alternatively be after the second acknowledgement information. In this case, because the length of the time domain resource occupied by the first data channel is less than the length of the time domain resource occupied by the second data channel, it may be considered that the first acknowledgement information and the second acknowledgement information are arranged in descending order of lengths of occupied time domain resources.

Optionally, in the HARQ-ACK feedback message, the first acknowledgement information and the second acknowledgement information are arranged in a sequence of the first data channel and the second data channel. For example, if the time domain resource occupied by the first data channel is before the time domain resource occupied by the second data channel, in the HARQ-ACK feedback message, the first acknowledgement information is before the second acknowledgement information.

Optionally, the HARQ-ACK feedback message further includes third acknowledgement information, and the third acknowledgement information indicates a third receiving state corresponding to a third data channel, and a length of a time domain resource occupied by the third data channel is a fourth time length. For example, the first time length is two symbols, the second time length is 1 ms, and the fourth time length is 0.5 ms. In descending order of lengths of occupied time domain resources, the second acknowledgement information is before the third acknowledgement information, and the third acknowledgement information is before the first acknowledgement information. In ascending order of lengths of occupied time domain resources, the first acknowledgement information is before the third acknowledgement information, and the third acknowledgement information is before the second acknowledgement information. Arrangement is performed in a data channel receiving sequence. Assuming that the receiving sequence is the second data channel, the third data channel, and the first data channel, the second acknowledgement information is before the third acknowledgement information, and the third acknowledgement information is before the first acknowledgement information.

Optionally, before the terminal device generates the HARQ-ACK feedback message, the method further includes: receiving, by the terminal device, signaling, where the signaling indicates a sequence of arranging a plurality of pieces of acknowledgement information included in the HARQ-ACK feedback message; and determining, by the terminal device based on the signaling, the sequence of arranging the plurality of pieces of acknowledgement information. For example, the terminal device determines, based on the signaling, a sequence of arranging the first acknowledgement information and the second acknowledgement information. The signaling is physical layer signaling or higher layer signaling.

By using the technical solution in this embodiment of the present invention, the HARQ-ACK feedback message generated by the terminal device is at least used to indicate the first receiving state corresponding to the first data channel and the second receiving state corresponding to the second data channel, and the first time length of the time domain resource occupied by the first data channel is different from the second time length of the time domain resource occupied by the second data channel. Therefore, the terminal device can efficiently feed back, by using one HARQ-ACK feedback message, receiving states corresponding to a plurality of data channels or a plurality of pieces of data transmission that occupy time domain resources of different lengths, and does not need to respectively send a plurality of feedback messages for a plurality of data channels occupying different time domain resources, thereby ensuring communication service quality.

Implementation 3

In an optional embodiment, the HARQ-ACK feedback message includes first acknowledgement information and second acknowledgement information. The first acknowledgement information is used to indicate logic and operation results of receiving states corresponding to M data channels, and the second acknowledgement information is used to indicate logic and operation results of receiving states corresponding to N data channels. The first data channel is one of the M data channels, the second data channel is one of the N data channels, and M and N are positive integers. The M data channels and the N data channels are data channels received by the terminal device. For a sequence of arranging the first acknowledgement information and the second acknowledgement information, refer to descriptions in the implementation 2. Details are not described herein again.

Before the terminal device generates the HARQ-ACK feedback message, the terminal device receives at least one of: the M data channels, or the N data channels. Optionally, the HARQ-ACK feedback message further indicates values of M and N.

Before the network device receives the HARQ-ACK feedback message on the time domain resource having the third time length, the method further includes at least one of following steps: sending, by the network device, S data channels; or sending, by the network device, T data channels, where the S data channels include the M data channels, the T data channels include the N data channels, S is an integer greater than or equal to M, and T is an integer greater than or equal to N.

Optionally, the S data channels and the T data channels are located in a same serving cell that is denoted as a first serving cell.

Optionally, the HARQ-ACK feedback message further indicates at least one of: a quantity M of data channels that are received by the terminal device and that are corresponding to the first acknowledgement information, or a quantity N of data channels that are received by the terminal device and that are corresponding to the second acknowledgement information. When S is not equal to M, the network device determines that the terminal device does not receive (S−M) data channels. When T is not equal to N, the network device determines that the terminal device does not receive (T−N) data channels. Because the terminal device may miss a data channel sent by the network device, the terminal device reports a quantity of received data channels to help the network device determine whether the terminal device misses the data channel, so that the network device retransmits the data channel.

Optionally, the terminal device receives signaling indicating values of S and T. Correspondingly, the network device sends the signaling indicating the values of S and T. When S is not equal to M, the terminal device determines that the first acknowledgement information is a NACK. When S is equal to M, the terminal device determines that the first acknowledgement information is the logic and operation results of the receiving states corresponding to the M data channels. When T is not equal to N, the terminal device determines that the second acknowledgement information is a NACK. When T is equal to N, the terminal device determines that the second acknowledgement information is the logic and operation results of the receiving states corresponding to the N data channels. Because the terminal device may miss a data channel sent by the network device, the terminal device receives signaling indicating the quantity of data channels sent by the network device to help the terminal device determine whether to miss the data channel, so that the network device retransmits the data channel.

Optionally, the first acknowledgement information is used to indicate the logic and operation results of the receiving states corresponding to the M data channels. Optionally, transmission modes of the M data channels all support only one codeword, and the first acknowledgement information is 1 bit. Optionally, a transmission mode of at least one of the M data channels supports two codewords that are respectively denoted as a codeword 0 and a codeword 1. The first acknowledgement information is 2 bits and is denoted as first bit information and second bit information. The first bit information indicates logic and operation results of receiving states corresponding to codewords 0 of the M data channels, and the second bit information indicates logic and operation results of receiving states corresponding to codewords 1 of the M data channels.

Optionally, the second acknowledgement information is used to indicate the logic and operation results of the receiving states corresponding to the N data channels. Optionally, transmission modes of the N data channels all support only one codeword, and the second acknowledgement information is 1 bit, that is, a quantity of bits of the second acknowledgement information is 1. Optionally, a transmission mode of at least one of the N data channels supports two codewords that are respectively denoted as a codeword 0 and a codeword 1. The second acknowledgement information is 2 bits and is denoted as first bit information and second bit information. The first bit information indicates logic and operation results of receiving states corresponding to codewords 0 of the N data channels, and the second bit information indicates logic and operation results of receiving states corresponding to codewords 1 of the N data channels.

Optionally, the first acknowledgement information is used to indicate a result obtained after logic and operation processing and a spatial bundling operation are performed on the receiving states corresponding to the M data channels. In this way, a quantity of bits of the first acknowledgement information is 1. Optionally, the second acknowledgement information is used to indicate a result after logic and operation and spatial bundling operation of the receiving states corresponding to the N data channels. In this way, a quantity of bits of the second acknowledgement information is 1. Spatial bundling refers to performing logic and operation processing on receiving states of a plurality of codewords, for example, two codewords of one piece of downlink data. It should be noted that when one piece of downlink data has only one codeword, it is equivalent that there is no spatial bundling operation.

Optionally, lengths of time domain resources occupied by the M data channels are the same. For example, the lengths of the time domain resources occupied by the M data channels are all the first time length. Optionally, lengths of time domain resources occupied by the S data channels are the same. For example, the lengths of the time domain resources occupied by the S data channels are all the first time length.

Optionally, lengths of time domain resources occupied by the N data channels are the same. For example, the lengths of the time domain resources occupied by the N data channels are all the second time length. Optionally, lengths of time domain resources occupied by the T data channels are the same. For example, the lengths of the time domain resources occupied by the T data channels are all the second time length.

Optionally, lengths of time domain resources occupied by some data channels in the M data channels are three symbols, and lengths of time domain resources occupied by the other data channels are four symbols. Alternatively, lengths of time domain resources occupied by some data channels in the S data channels are three symbols, and lengths of time domain resources occupied by the other data channels are four symbols. That is, the first time length is three or four symbols.

Optionally, lengths of time domain resources occupied by some data channels in the N data channels are three symbols, and lengths of time domain resources occupied by the other data channels are four symbols. Alternatively, lengths of time domain resources occupied by some data channels in the T data channels are three symbols, and lengths of time domain resources occupied by the other data channels are four symbols. That is, the second time length is three or four symbols.

Optionally, the lengths of the time domain resources occupied by the M data channels are all less than 1 ms, and the lengths of the time domain resources occupied by the N data channels are 1 ms. Optionally, the lengths of the time domain resources occupied by the S data channels are all less than 1 ms, and the lengths of the time domain resources occupied by the T data channels are 1 ms.

Optionally, when there is only one data receiving state, a logic and operation result of the data receiving state is the data receiving state itself. For example, when M is equal to 1, the logic and operation results of the receiving states corresponding to all the data channels in the M data channels are the receiving state corresponding to the data channel. For example, when N is equal to 1, the logic and operation results of the receiving states corresponding to all the data channels in the N data channels are the receiving state corresponding to the data channel.

Figure 5:
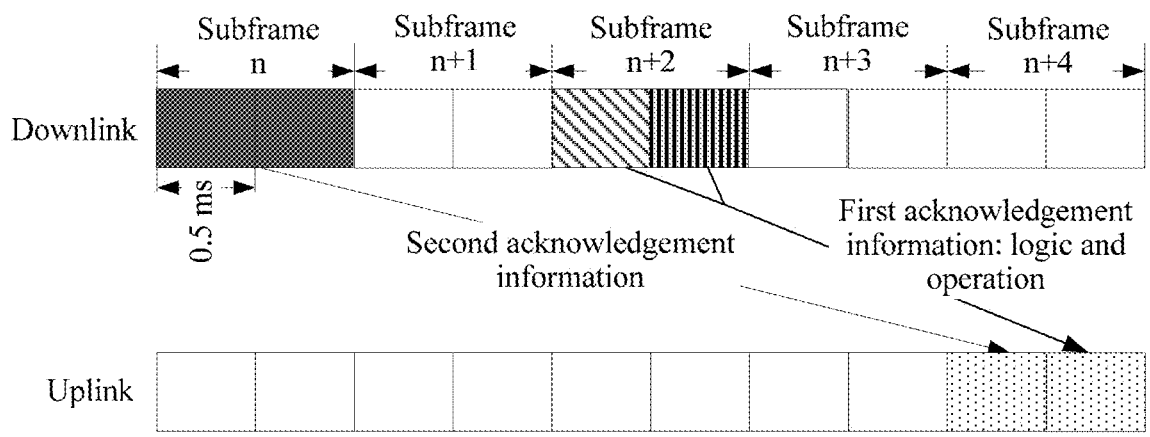
FIG. 5 is a fourth schematic diagram according to an embodiment of the present invention.

As shown in FIG. 5, a time domain resource occupied by the first data channel is a first timeslot in a downlink subframe n+2, a time domain resource occupied by the second data channel is a downlink subframe n, and a time domain resource occupied by the third data channel is a second timeslot in the downlink subframe n+2. M is equal to 2, the M data channels include the first data channel and the third data channel, and the lengths of the time domain resources occupied by the M data channels are all one timeslot or 0.5 ms. The first acknowledgement information is used to indicate the logic and operation result of the receiving state corresponding to the first data channel and the logic and operation result of the receiving state corresponding to the third data channel. N is equal to 1, the N data channels include only the second data channel, and the second acknowledgement information is used to indicate the receiving state corresponding to the second data channel.

Because data channels of different time lengths may have different performance, logic and operation processing may be separately performed on receiving states of the data channels of different time lengths. In addition, according to the method in this embodiment, because a quantity of bits occupied by a logic and operation result is relatively small, overheads of the HARQ-ACK feedback message can be reduced.

Implementation 4

In an optional embodiment, the HARQ-ACK feedback message includes X pieces of acknowledgement information, and the X pieces of acknowledgement information include the first acknowledgement information and the second acknowledgement information. The X pieces of acknowledgement information respectively indicate receiving states corresponding to X data channels, the first acknowledgement information indicates the first receiving state of the first data channel, the second acknowledgement information indicates the second receiving state of the second data channel, the X data channels include the first data channel and the second data channel, and X is an integer greater than or equal to 2.

For a sequence of arranging the first acknowledgement information and the second acknowledgement information, refer to descriptions in the implementation 2. Details are not described herein again. It should be noted that when time lengths of time domain resources occupied by a plurality of data channels in the X pieces of acknowledgement information are the same, a plurality of pieces of acknowledgement information corresponding to the plurality of data channels are arranged in a data channel receiving sequence.

Optionally, the X data channels are located in a same serving cell (denoted as a first serving cell).

Optionally, quantities of bits of any two pieces of acknowledgement information in the X pieces of acknowledgement information are the same, and are 1 or 2. Optionally, quantities of bits of at least two pieces of acknowledgement information in the X pieces of acknowledgement information are different.

Optionally, a quantity of bits of the first acknowledgement information and a quantity of bits of the second acknowledgement information are separately configured. Optionally, the quantity of bits of the first acknowledgement information and the quantity of bits of the second acknowledgement information may be the same, or may be different. For example, the terminal device configures the quantity of bits of the first acknowledgement information based on a transmission mode of the first data channel, and configures the quantity of bits of the second acknowledgement information based on a transmission mode of the second data channel. If the transmission mode of the first data channel supports only one transport block, the first acknowledgement information is 1 bit, and if the transmission mode of the first data channel supports two transport blocks, the first acknowledgement information is 2 bits. If the transmission mode of the second data channel supports only one transport block, the second acknowledgement information is 1 bit, and if the transmission mode of the second data channel supports two transport blocks, the second acknowledgement information is 2 bits. Because the network device may configure different transmission modes for the first data channel and the second data channel, it is more flexible to separately configure the quantity of bits of the first acknowledgement information and the quantity of bits of the second acknowledgement information.

Optionally, the X data channels include P received data channels and (X−P) unreceived data channels, P pieces of acknowledgement information in the X pieces of acknowledgement information are respectively used to indicate receiving states corresponding to the P received data channels, (X−P) pieces of acknowledgement information in the X pieces of acknowledgement information are respectively used to indicate receiving states corresponding to the (X−P) unreceived data channels, the receiving states corresponding to the (X−P) unreceived data channels are NACKs or DTX, P is an integer, and P≤X. It should be noted that the received data channel is a data channel received by the terminal device, and the unreceived data channel is a data channel that is not received by the terminal device. The first data channel is one of the P received data channels, or is one of the (X−P) unreceived data channels. The second data channel is one of the P received data channels, or is one of the (X−P) unreceived data channels. It should be noted that when P is equal to X, the X data channels are all received data channels.

Optionally, because the data channel is scheduled by using a control channel, the terminal device may detect whether the control channel exists, to determine whether the data channel exists. If the terminal device does not detect a specific control channel, the terminal device does not receive a data channel scheduled by using the control channel. If the terminal device detects a specific control channel, the terminal device receives a data channel scheduled by using the control channel. After further decoding the data channel, the terminal device determines whether to correctly receive the data channel. In addition, the terminal device may obtain a total quantity of data channels that need to be received, to determine, as a NACK or DTX, HARQ-ACK information of a data channel other than a received data channel in the total quantity of data channels.

Optionally, the X data channels include the M data channels and the N data channels, the first data channel is one of the M data channels, the second data channel is one of the N data channels, and M and N are positive integers. For the lengths of the time domain resources occupied by the M data channels and the lengths of the time domain resources occupied by the N data channels, refer to descriptions in the implementation 3.

Optionally, the ACK is represented by '1' in binary, and at least one of the NACK or the DTX is represented by '0' in binary.

Optionally, the third time length is 1 ms, X is equal to 3, and the three data channels include the first data channel, the second data channel, and the third data channel. Lengths of time domain resources occupied by the first data channel and the third data channel are both 0.5 ms, and the length of the time domain resource occupied by the second data channel is 1 ms. If transmission modes of the first data channel and the third data channel both support two transport blocks and both the first data channel and the third data channel are correctly received by the terminal device, and the transmission mode of the second data channel supports only one transport block and the second data channel is not received by the terminal device, a binary bit stream of the three pieces of acknowledgement information is "0 11 11" in descending order.

Optionally, the third time length is 1 ms, X is equal to 7 or 8, and the X data channels include one data channel that occupies a time domain resource of a 1 ms length and six or seven data channels that occupy time domain resources of a two-symbol length. The length of the time domain resource occupied by the first data channel is two symbols, and the length of the time domain resource occupied by the second data channel is 1 ms. If the transmission mode of the second data channel supports only one transport block and the second data channel is correctly received by the terminal device, transmission modes of data channels that occupy time domain resources of a two-symbol length all support two transport blocks. The first two data channels in the six or seven data channels are not received by the terminal device, the third data channel in the six or seven data channels is incorrectly received by the terminal device, and the last three or four data channels are all correctly received by the terminal device. Therefore, a binary bit stream of the seven pieces of acknowledgement information is "1 00 00 00 11 11 11" or a binary bit stream of the eight pieces of acknowledgement information is "1 00 00 00 11 11 11 11" in descending order.

Optionally, the third time length is 0.5 ms, X is equal to 2, and the two data channels include the first data channel and the second data channel. The length of the time domain resource occupied by the first data channel is 0.5 ms, and the length of the time domain resource occupied by the second data channel is 1 ms. If transmission modes of the first data channel and the second data channel both support two transport blocks, the first data channel is not received by the terminal device, and the second data channel is correctly received by the terminal device, a binary bit stream of the two pieces of acknowledgement information is "11 00" in descending order.

Optionally, the third time length is two symbols, X is equal to 2, and the two data channels include the first data channel and the second data channel. The length of the time domain resource occupied by the first data channel is two symbols, and the length of the time domain resource occupied by the second data channel is 1 ms. If transmission modes of the first data channel and the second data channel both support two transport blocks, the first data channel is incorrectly received by the terminal device, and the second data channel is correctly received by the terminal device, a binary bit stream of the two pieces of acknowledgement information is "11 00" in descending order.

Optionally, the terminal device receives downlink control information (DCI), and the DCI is used to perform at least one of the following: indicating a value of X, or a sending identifier of a data channel. For example, the DCI indicates that X is equal to 3, and indicates a sending sequence identifier of the three data channels.

Before the terminal device generates the HARQ-ACK feedback message, the terminal device receives the P data channels. Optionally, the HARQ-ACK feedback message further indicates a value of P. If after receiving the HARQ-ACK feedback message, the network device finds that P is less than the quantity of data channels sent by the network device, the network device determines that the terminal device does not receive one or more data channels in the X data channels. Further, the network device retransmits the unreceived data channels, to ensure communication service quality.

In this embodiment of the present invention, although overheads of the HARQ-ACK feedback message are relatively high, the network device can determine a receiving state of each data channel by using the HARQ-ACK feedback message, to retransmit one or more data channels that are incorrectly received or not received.

Implementation 5

In an optional embodiment, the terminal device determines a PUCCH resource based on the first receiving state corresponding to the first data channel and the second receiving state corresponding to the second data channel, and the PUCCH resource is carried on the time domain resource having the third time length.

The terminal device sends the HARQ-ACK feedback message on the determined PUCCH resource.

Optionally, the terminal device determines a feedback resource from two candidate PUCCH resources based on the first receiving state, the second receiving state, and a resource mapping relationship.

Optionally, the resource mapping relationship includes at least one of the following relationships:

Relationship 1: The receiving state of the first data channel is an ACK, and the feedback resource is a PUCCH feedback resource corresponding to the first data channel.

Relationship 2: The receiving state of the first data channel is a NACK or DTX, the receiving state of the second data channel is an ACK or a NACK, and the feedback resource is a PUCCH feedback resource corresponding to the second data channel.

Relationship 3: The receiving state of the first data channel is a NACK or DTX, the receiving state of the second data channel is DTX, and the terminal device does not send the HARQ-ACK feedback message.

Optionally, the resource mapping relationship includes at least one of the following relationships:

Relationship 4: The receiving state of the second data channel is an ACK, and the feedback resource is a PUCCH feedback resource corresponding to the second data channel.

Relationship 5: The receiving state of the second data channel is a NACK or DTX, the receiving state of the first data channel is an ACK or a NACK, and the feedback resource is a PUCCH feedback resource corresponding to the first data channel.

Relationship 6: The receiving state of the second data channel is a NACK or DTX, the receiving state of the first data channel is DTX, and the terminal device does not send the HARQ-ACK feedback message.

Optionally, the terminal device determines the feedback resource and the HARQ-ACK feedback message based on the first receiving state, the second receiving state, and Table 1. "No transmission" means that the terminal device does not send the HARQ-ACK feedback message to the network device. The HARQ-ACK feedback message is 2 bits. Optionally, in Table 1, a represents "first", b represents "second", $n_{PUCCH,0}$ represents the PUCCH feedback resource corresponding to the second data channel, and $n_{PUCCH,1}$ represents the PUCCH feedback resource corresponding to the first data channel. Optionally, in Table 1, a represents "second", b represents "first", $n_{PUCCH,0}$ represents the PUCCH feedback resource corresponding to the first data channel, and $n_{PUCCH,1}$ represents the PUCCH feedback resource corresponding to the second data channel.

TABLE 1

| $a^{th}$ receiving state | $b^{th}$ receiving state | Feedback resource | 2-bit HARQ-ACK feedback message |
|---|---|---|---|
| ACK | ACK | $n_{PUCCH,1}^{(1)}$ | 1, 1 or 1, 0 |
| NACK/DTX | ACK | $n_{PUCCH,0}^{(1)}$ | 1, 1 |
| ACK | NACK/DTX | $n_{PUCCH,1}^{(1)}$ | 0, 0 or 0, 1 |
| NACK/DTX | NACK | $n_{PUCCH,0}^{(1)}$ | 0, 0 |
| NACK/DTX | DTX | | No transmission |

Correspondingly, the network device determines, based on the HARQ-ACK feedback message and the feedback resource carrying the HARQ-ACK feedback message, the first receiving state corresponding to the first data channel and the second receiving state corresponding to the second data channel.

Optionally, the network device determines the first receiving state and the second receiving state based on the HARQ-ACK feedback message, the feedback resource carrying the HARQ-ACK feedback message, and Table 1.

Implementation 6

In an optional embodiment, the first data channel and the second data channel are located in a first serving cell (denoted as a serving cell c), and the HARQ-ACK feedback message is further used to indicate a third receiving state corresponding to a third data channel. The third data channel is located in a second serving cell (denoted as a serving cell d), both c and d are serving cell identifiers, and are integers greater than or equal to 0.

Optionally, the HARQ-ACK feedback message at least includes a first information field and a second information field. The first information field indicates a receiving state corresponding to a data channel in the serving cell c, and the first information field is at least used to indicate the first receiving state and the second receiving state. The second information field indicates a receiving state corresponding to a data channel in the serving cell d, and the second information field is at least used to indicate the third receiving state. Optionally, c is less than d, and in the HARQ-ACK feedback message, the first information field is before the second information field. Optionally, c is greater than d, and in the HARQ-ACK feedback message, the first information field is after the second information field. It should be noted that for a method in which the HARQ-ACK feedback message indicates the receiving state of the data channel in the serving cell c or the serving cell d, refer to the implementation 1 to the implementation 5. Details are not described herein again.

In this case, the HARQ-ACK feedback message can feed back receiving states corresponding to data channels in different serving cells during carrier aggregation, that is, receiving states corresponding to a plurality of data channels that are in different serving cells and that occupy time domain resources of different lengths are fed back by using one feedback message.

Optionally, the HARQ-ACK feedback message is further used to indicate a fourth receiving state corresponding to a fourth data channel. The fourth data channel is located in the second serving cell, and the length of the time domain resource occupied by the third data channel is less than a length of a time domain resource occupied by the fourth data channel. Optionally, the HARQ-ACK feedback message at least includes the first acknowledgement information, the second acknowledgement information, the third acknowledgement information, and fourth acknowledgement information, to respectively indicate the first receiving state corresponding to the first data channel, the second receiving state corresponding to the second data channel, the third receiving state corresponding to the third data channel, and the fourth receiving state corresponding to the fourth data channel. Optionally, in the HARQ-ACK feedback message, the four pieces of acknowledgement information are arranged in ascending or descending order of time lengths of time domain resources occupied by data channels, and a plurality of pieces of acknowledgement information corresponding to a plurality of data channels of a same time length are arranged in ascending order of serving cell identifiers. Optionally, in the HARQ-ACK feedback message, the four pieces of acknowledgement information are arranged in a data channel receiving sequence, and a plurality of pieces of acknowledgement information corresponding to a plurality of data channels received at the same time are arranged in ascending order of serving cell identifiers.

To implement the foregoing embodiments, an embodiment of the present invention further provides a terminal device. It should be noted that the terminal device can perform the method in the foregoing embodiments. Therefore, for specific details of this embodiment, refer to descriptions in the foregoing embodiments. For brevity, the same content is not described below.

Figure 6:
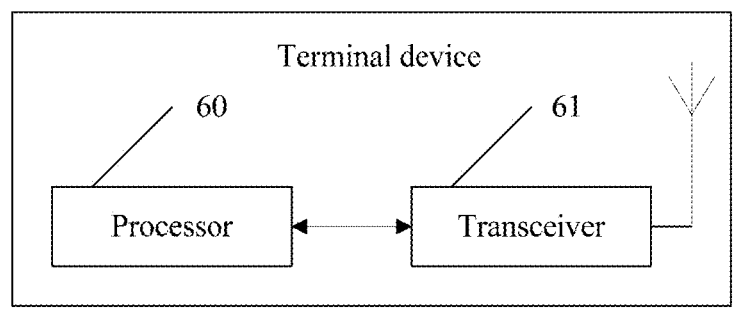
FIG. 6 is a schematic structural diagram of a first terminal device according to an embodiment of the present invention.

As shown in FIG. 6, the terminal device may include a processor and a transceiver. Certainly, the terminal device may further include a memory and the like.

The processor is configured to: determine a first receiving state corresponding to a first data channel and a second receiving state corresponding to a second data channel; and generate a hybrid automatic repeat request-acknowledgement HARQ-ACK feedback message. The HARQ-ACK feedback message is at least used to indicate the first receiving state corresponding to the first data channel and the second receiving state corresponding to the second data channel, a length of a time domain resource occupied by the first data channel is a first time length, a length of a time domain resource occupied by the second data channel is a second time length, and the first time length is less than the second time length.

The transceiver is configured to send the HARQ-ACK feedback message on a time domain resource having a third time length.

In an optional embodiment, the transceiver is configured to: before sending the HARQ-ACK feedback message on the time domain resource having the third time length, receive signaling used to indicate the third time length.

In an optional embodiment, the transceiver is configured to: before the processor generates the HARQ-ACK feedback message, receive at least two downlink data channels. The at least two downlink data channels include the first data channel and the second data channel, the HARQ-ACK feedback message indicates the first receiving state and the second receiving state by using a logic and operation result of receiving states corresponding to all of the at least two downlink data channels.

In an optional embodiment, the HARQ-ACK feedback message includes first acknowledgement information and second acknowledgement information, the first acknowledgement information is used to indicate the first receiving state corresponding to the first data channel, and the second acknowledgement information is used to indicate the second receiving state corresponding to the second data channel. In the HARQ-ACK feedback message, the first acknowledgement information is after the second acknowledgement information.

To implement the foregoing embodiments, an embodiment of the present invention further provides another terminal device. It should be noted that the terminal device can perform the method in the foregoing embodiments. Therefore, for specific details of this embodiment, refer to descriptions in the foregoing embodiments. For brevity, the same content is not described below.

Figure 7:
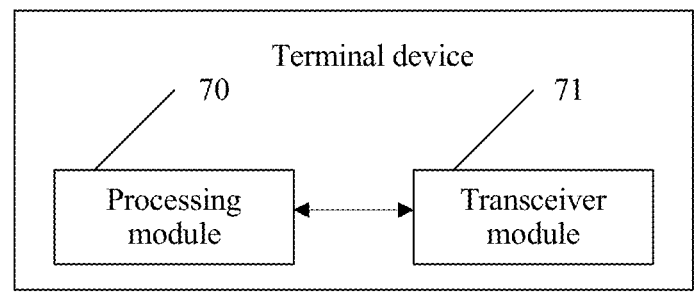
FIG. 7 is a schematic structural diagram of a second terminal device according to an embodiment of the present invention.

As shown in FIG. 7, the terminal device may include a processing module and a transceiver module. Certainly, the terminal device may further include a storage module and the like.

The processing module is configured to: determine a first receiving state corresponding to a first data channel and a second receiving state corresponding to a second data channel; and generate a hybrid automatic repeat request-acknowledgement HARQ-ACK feedback message. The HARQ-ACK feedback message is at least used to indicate the first receiving state corresponding to the first data channel and the second receiving state corresponding to the second data channel, a length of a time domain resource occupied by the first data channel is a first time length, a length of a time domain resource occupied by the second data channel is a second time length, and the first time length is less than the second time length.

The transceiver module is configured to send the HARQ-ACK feedback message on a time domain resource having a third time length.

In an optional embodiment, the transceiver module is configured to: before sending the HARQ-ACK feedback message on the time domain resource having the third time length, receive signaling used to indicate the third time length.

In an optional embodiment, the transceiver module is configured to: before the processing module generates the HARQ-ACK feedback message, receive at least two downlink data channels. The at least two downlink data channels include the first data channel and the second data channel, the HARQ-ACK feedback message indicates the first receiving state and the second receiving state by using a logic and operation result of receiving states corresponding to all of the at least two downlink data channels.

In an optional embodiment, the HARQ-ACK feedback message includes first acknowledgement information and second acknowledgement information, the first acknowledgement information is used to indicate the first receiving state corresponding to the first data channel, and the second acknowledgement information is used to indicate the second receiving state corresponding to the second data channel. In the HARQ-ACK feedback message, the first acknowledgement information is after the second acknowledgement information.

It should be noted that for a specific implementation of determining, by the terminal device, the receiving state of the data channel, generating the HARQ-ACK feedback message, and sending the HARQ-ACK feedback message on the time domain resource having the third time length, refer to descriptions in the method embodiments. The terminal device embodiments and the foregoing method embodiments are based on a same concept. Technical effects of the terminal device embodiments are the same as those of the method embodiments of the present invention. For specific content, refer to descriptions in the method embodiments of the present invention. Details are not described herein again.

To implement the foregoing embodiments, an embodiment of the present invention further provides a network device. It should be noted that the network device can perform the method in the foregoing embodiments. Therefore, for specific details of this embodiment, refer to descriptions in the foregoing embodiments. For brevity, the same content is not described below.

Figure 8:
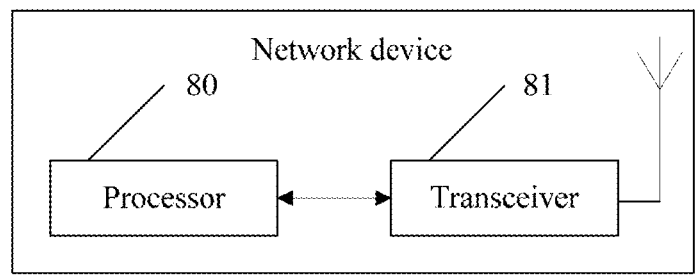
FIG. 8 is a schematic structural diagram of a first network device according to an embodiment of the present invention.

As shown in FIG. 8, the network device may include a processor and a transceiver. Certainly, the network device may further include a memory and the like.

The transceiver is configured to receive an HARQ-ACK feedback message on a time domain resource having a third time length. The HARQ-ACK feedback message is at least used to indicate a first receiving state corresponding to a first data channel and a second receiving state corresponding to a second data channel, a length of a time domain resource occupied by the first data channel is a first time length, a length of a time domain resource occupied by the second data channel is a second time length, and the first time length is less than the second time length.

The processor is configured to determine, based on the HARQ-ACK feedback message, the first receiving state corresponding to the first data channel and the second receiving state corresponding to the second data channel.

In an optional embodiment, the transceiver is configured to: before receiving the HARQ-ACK feedback message on the time domain resource having the third time length, send signaling used to indicate the third time length.

In an optional embodiment, the transceiver is configured to: before receiving the HARQ-ACK feedback message on the time domain resource having the third time length, send at least two downlink data channels. The at least two downlink data channels include the first data channel and the second data channel, the HARQ-ACK feedback message indicates the first receiving state and the second receiving state by using a logic and operation result of receiving states corresponding to all of the at least two downlink data channels.

In an optional embodiment, the HARQ-ACK feedback message includes first acknowledgement information and second acknowledgement information, the first acknowledgement information is used to indicate the first receiving state corresponding to the first data channel, and the second acknowledgement information is used to indicate the second receiving state corresponding to the second data channel. In the HARQ-ACK feedback message, the first acknowledgement information is after the second acknowledgement information.

To implement the foregoing embodiments, an embodiment of the present invention further provides another network device. It should be noted that the network device can perform the method in the foregoing embodiments. Therefore, for specific details of this embodiment, refer to descriptions in the foregoing embodiments. For brevity, the same content is not described below.

Figure 9:
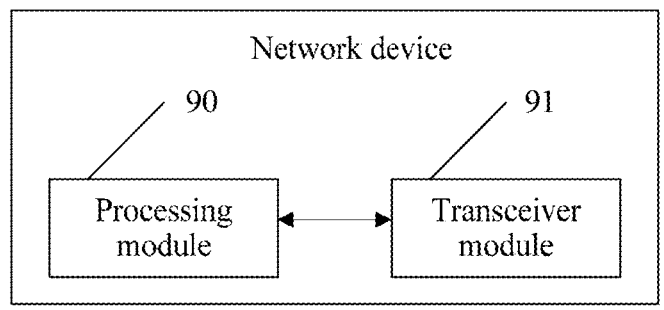
FIG. 9 is a schematic structural diagram of a second network device according to an embodiment of the present invention.

As shown in FIG. 9, the network device may include a processing module and a transceiver module. Certainly, the network device may further include a storage module and the like.

The transceiver module is configured to receive an HARQ-ACK feedback message on a time domain resource having a third time length. The HARQ-ACK feedback message is at least used to indicate a first receiving state corresponding to a first data channel and a second receiving state corresponding to a second data channel, a length of a time domain resource occupied by the first data channel is a first time length, a length of a time domain resource occupied by the second data channel is a second time length, and the first time length is less than the second time length.

The processing module is configured to determine, based on the HARQ-ACK feedback message, the first receiving state corresponding to the first data channel and the second receiving state corresponding to the second data channel.

In an optional embodiment, the transceiver module is configured to: before receiving the HARQ-ACK feedback message on the time domain resource having the third time length, send signaling used to indicate the third time length.

In an optional embodiment, the transceiver module is configured to: before receiving the HARQ-ACK feedback message on the time domain resource having the third time length, send at least two downlink data channels. The at least two downlink data channels include the first data channel and the second data channel, the HARQ-ACK feedback message indicates the first receiving state and the second receiving state by using a logic and operation result of receiving states corresponding to all of the at least two downlink data channels.

In an optional embodiment, the HARQ-ACK feedback message includes first acknowledgement information and second acknowledgement information, the first acknowledgement information is used to indicate the first receiving state corresponding to the first data channel, and the second acknowledgement information is used to indicate the second receiving state corresponding to the second data channel. In the HARQ-ACK feedback message, the first acknowledgement information is after the second acknowledgement information.

It should be noted that for a specific implementation of receiving, by the network device, the HARQ-ACK feedback message on the time domain resource having the third time length, and determining, based on the HARQ-ACK feedback message, the receiving state corresponding to the data channel, refer to descriptions in the method embodiments. The network device embodiments and the foregoing method embodiments are based on a same concept. Technical effects of the network device embodiments are the same as those of the method embodiments of the present invention. For specific content, refer to descriptions in the method embodiments of the present invention. Details are not described herein again.

It should be understood that, the processor in all the embodiments of the present invention may be a central processing unit (CPU), or may be another general purpose processor, a digital signal processor (DSP), an application-specific integrated circuit (ASIC), a field programmable gate array (FPGA) or another programmable logic device, discrete gate or transistor logic device, discrete hardware component, or the like. In addition, the network device and the terminal device in the foregoing embodiments of the present invention may further include a component such as a memory. The memory herein may include a read-only memory and a random access memory, and provide an instruction and data for the processor. A part of the memory may further include a non-volatile random access memory. For example, the memory may further store information about a device type. The processor invokes instruction code in the memory, to control other modules of the network device and the terminal device in the embodiments of the present invention to perform the foregoing operations.

It should be understood that "an embodiment", "one embodiment", or "this embodiment of the present invention" mentioned in the whole specification means that particular features, structures, or characteristics related to the embodiment are included in at least one embodiment of the present invention. Therefore, "in an embodiment", "in one embodiment", or "in this embodiment of the present invention" appearing throughout the specification does not necessarily refer to a same embodiment. In addition, these particular features, structures, or characteristics may be combined in one or more embodiments by using any appropriate manner.

It should be understood that sequence numbers of the foregoing processes do not mean execution sequences in various embodiments of the present invention. The execution sequences of the processes should be determined based on functions and internal logic of the processes, and should not be construed as any limitation on the implementation processes of the embodiments of the present invention.

In addition, the terms "system" and "network" are interchangeable in this specification. It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects.

It should be understood that in the embodiments of this application, "B corresponding to A" indicates that B is associated with A, and B may be determined based on A. However, it should further be understood that determining B based on A does not mean that B is determined based on A only; that is, B may also be determined based on A and/or other information.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, compositions and steps of each example are generally described above according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

In the embodiments of this application, the displayed or discussed mutual couplings or direct couplings or communication connections may be implemented by using some interfaces. The indirect couplings or communication connections between the apparatuses or units may be implemented in electronic, mechanical, or other forms.

The foregoing units as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A feedback message sending method comprising:
   determining, by a terminal device, a first receiving state associated with a first data channel and a second receiving state associated with a second data channel;

generating, by the terminal device, a hybrid automatic repeat request-acknowledgement (HARQ-ACK) feedback message that includes first and second acknowledgement information indicating the first and second receiving states, respectively,
    wherein an ordering of the first and second acknowledgement information in the HARQ-ACK is determined by a first time length of a first time domain resource in a first downlink subframe occupied by the first data channel and a second time length of a second time domain resource in a second downlink subframe occupied by the second data channel; and sending, by the terminal device, the HARQ-ACK feedback message on a third time domain resource having a third time length in an uplink subframe,
    wherein the ordering of each of the first and second acknowledgement information sent in the HARQ-ACK feedback message is determined by relative time lengths of the first and second time length, and
    wherein a location of the third time domain resource is determined according to a time sequence relationship between the third time domain resource and each of the first and second time domain resources.

2. The method according to claim 1, wherein before sending the HARQ-ACK feedback message on the time domain resource having the third time length, the method further comprises receiving, by the terminal device, signaling indicating the third time length.

3. The method according to claim 1, wherein before generating the HARQ-ACK feedback message, the method further comprises:
    receiving, by the terminal device, at least two downlink data channels, wherein the at least two downlink data channels comprise the first data channel and the second data channel, wherein
    the HARQ-ACK feedback message indicates the first receiving state and the second receiving state by using a logic and operation result of receiving states associated with all of the at least two downlink data channels.

4. The method according to claim 1, wherein the first data channel is one of M data channels, the second data channel is one of N data channels, and M and N are positive integers; and
    before generating the HARQ-ACK feedback message, the method further comprises at least one of following:
        (a) receiving, by the terminal device, the M data channels, wherein the first acknowledgement information indicates logic and operation results of receiving states associated with all of the M data channels; and
        (b) receiving, by the terminal device, the N data channels, wherein the second acknowledgement information indicates logic and operation results of receiving states associated with all of the N data channels.

5. The method according to claim 1, wherein the HARQ-ACK feedback message comprises X pieces of acknowledgement information, the X pieces of acknowledgement information comprise the first acknowledgement information and the second acknowledgement information, the X pieces of acknowledgement information respectively indicate receiving states associated with X data channels, the X data channels comprise the first data channel and the second data channel, and X is an integer greater than or equal to 2.

6. The method according to claim 5, wherein the X data channels comprise P received data channels and (X−P) unreceived data channels, P pieces of acknowledgement information in the X pieces of acknowledgement information respectively indicate receiving states associated with the P received data channels, (X−P) pieces of acknowledgement information in the X pieces of acknowledgement information respectively indicate receiving states associated with the (X−P) unreceived data channels, the receiving states associated with the (X−P) unreceived data channels are negative acknowledgements (NACKs) or discontinuous transmission (DTX), P is an integer, and P≤X;
    the first data channel is one of the P received data channels, or is one of the (X−P) unreceived data channels; and
    the second data channel is one of the P received data channels, or is one of the (X−P) unreceived data channels.

7. The method according to claim 1, wherein before sending the HARQ-ACK feedback message on the time domain resource having the third time length, the method further comprises:
    determining, by the terminal device, a physical uplink control channel (PUCCH) resource based on the first receiving state and the second receiving state,
        wherein the PUCCH resource is located on the time domain resource having the third time length; and
        wherein sending the HARQ-ACK feedback message on the time domain resource having the third time length comprises:
    sending, by the terminal device, the HARQ-ACK feedback message on the determined PUCCH resource.

8. The method according to claim 1, wherein
the first data channel and the second data channel are located in a first serving cell; and
the HARQ-ACK feedback message further indicates a third receiving state associated with a third data channel, wherein the third data channel is located in a second serving cell.

9. A terminal device comprising:
a processor configured to:
determine a first receiving state corresponding to a first data channel and a second receiving state associated with a second data channel; and
generate a hybrid automatic repeat request-acknowledgement (HARQ-ACK) feedback message that includes first and second acknowledgement information indicating the first and second receiving states, respectively,
    wherein an ordering of the first and second acknowledgement information in the HARQ-ACK is determined by a first time length of a first time domain resource in a first downlink subframe occupied by the first data channel, and a second time length of a second time domain resource in a second downlink subframe occupied by the second data channel; and
a transceiver including a receiver and a transmitter, wherein the transmitter is configured to cooperate with the processor to send the HARQ-ACK feedback message on a third time domain resource having a third time length in an uplink subframe,
    wherein the ordering of each of the first and second acknowledgement information sent in the HARQ-ACK feedback message is determined by relative time lengths of the first and second time length, and
    wherein a location of the third time domain resource is determined according to a time sequence relationship between the third time domain resource and each of the first and second time domain resources.

10. The terminal device according to claim 9, wherein the receiver is configured to: before the HARQ-ACK feedback message on the time domain resource having the third time length is sent, cooperate with the processor to receive signaling indicating the third time length.

11. The terminal device according to claim 9, wherein the receiver is configured to:
  before the processor generates the HARQ-ACK feedback message, cooperate with the processor to receive at least two downlink data channels, wherein the at least two downlink data channels comprise the first data channel and the second data channel,
    wherein the HARQ-ACK feedback message indicates the first receiving state and the second receiving state by using a logic and operation result of receiving states associated with all of the at least two downlink data channels.

12. The terminal device according to claim 9, wherein the first data channel is one of M data channels, the second data channel is one of N data channels, and M and N are positive integers; and
  the receiver is configured to perform at least one of following operations:
    (a) before the processor generates the HARQ-ACK feedback message, cooperating with the processor to receive the M data channels, wherein the first acknowledgement information indicates logic and operation results of receiving states associated with all of the M data channels; and
    (b) cooperating with the processor to receive the N data channels, wherein the second acknowledgement information indicates logic and operation results of receiving states associated with all of the N data channels.

13. The terminal device according to claim 9, wherein the HARQ-ACK feedback message comprises X pieces of acknowledgement information, the X pieces of acknowledgement information comprise the first acknowledgement information and the second acknowledgement information, the X pieces of acknowledgement information respectively indicate receiving states associated with X data channels, the X data channels comprise the first data channel and the second data channel, and X is an integer greater than or equal to 2.

14. The terminal device according to claim 13, wherein the X data channels comprise P received data channels and (X−P) unreceived data channels, P pieces of acknowledgement information in the X pieces of acknowledgement information respectively indicate receiving states associated with the P received data channels, (X−P) pieces of acknowledgement information in the X pieces of acknowledgement information respectively indicate receiving states associated with the (X−P) unreceived data channels, the receiving states associated with the (X−P) unreceived data channels are negative acknowledgements (NACKs) or discontinuous transmission (DTX), P is an integer, and P≤X;
  the first data channel is one of the P received data channels, or is one of the (X−P) unreceived data channels; and
  the second data channel is one of the P received data channels, or is one of the (X−P) unreceived data channels.

15. The terminal device according to claim 9, wherein
  the processor is further configured to, before the transmitter sends the HARQ-ACK feedback message on the time domain resource having the third time length, determine a physical uplink control channel (PUCCH) resource based on the first receiving state and the second receiving state, wherein the PUCCH resource is located on the time domain resource having the third time length; and
  the transmitter is further configured to cooperate with the processor to send the HARQ-ACK feedback message on the PUCCH resource.

16. The terminal device according to claim 9, wherein
  the first data channel and the second data channel are located in a first serving cell; and
  the HARQ-ACK feedback message further indicates a third receiving state associated with a third data channel, wherein the third data channel is located in a second serving cell.

17. A non-transitory computer readable medium comprising processor-executable computer program, which when executed by a processor of a computer, cause the computer to:
  determine a first receiving state associated with a first data channel and a second receiving state associated with a second data channel;
  generate a hybrid automatic repeat request-acknowledgement (HARQ-ACK) feedback message that includes first and second acknowledgement information indicating the first and second receiving states, respectively,
  wherein an ordering of the first and second acknowledgement information in the HARQ-ACK is determined by a first time length of a first time domain resource in a first downlink subframe occupied by the first data channel, and a second time length of a second time domain resource in a second downlink subframe occupied by the second data channel; and
  send the HARQ-ACK feedback message on a third time domain resource having a third time length in an uplink subframe,
    wherein the ordering of each of the first and second acknowledgement information sent in the HARQ-ACK feedback message is determined by relative time lengths of the first and second time length, and
    wherein a location of the third time domain resource is determined according to a time sequence relationship between the third time domain resource and each of the first and second time domain resources.

18. The non-transitory computer readable medium according to claim 17, wherein before sending the HARQ-ACK feedback message on the time domain resource having the third time length, the computer program further causes the computer to receive signaling indicating the third time length.

19. The non-transitory computer readable medium according to claim 17, wherein before generating the HARQ-ACK feedback message, the computer program further causes the computer to:
  receive at least two downlink data channels, wherein the at least two downlink data channels comprise the first data channel and the second data channel,
    wherein the HARQ-ACK feedback message indicates the first receiving state and the second receiving state by using a logic and operation result of receiving states associated with all of the at least two downlink data channels.

20. The non-transitory computer readable medium according to claim 17, wherein the first data channel and the second data channel are located in a first serving cell, and the HARQ-ACK feedback message further indicates a third receiving state associated with a third data channel located in a second serving cell.

* * * * *